United States Patent [19]

Haga et al.

[11] Patent Number: 5,243,884
[45] Date of Patent: Sep. 14, 1993

[54] TOOL HOLDER DEVICE HAVING SCREW-OPERATED MEANS FOR CONNECTION AND DISCONNECTION OF TWO ENGAGEABLE MEMBERS FOR ATTACHMENT AND REMOVAL OF CUTTING TOOL

[75] Inventors: Katsutoshi Haga, Toyota; Mitsuhiko Tomioka, Anjo; Hiroyuki Yokoseki, Toyota; Tatsuro Takami, Toyota; Hisatoshi Yoshida, Toyota; Kenji Odaka, Toyota, all of Japan

[73] Assignee: Fuji Seiko Limited, Toyota, Japan

[21] Appl. No.: 799,062

[22] Filed: Nov. 27, 1991

[30] Foreign Application Priority Data

Nov. 30, 1990 [JP] Japan ............... 2-129334[U]

[51] Int. Cl.$^5$ ............................................. B23B 29/12
[52] U.S. Cl. ...................................... 82/160; 409/234
[58] Field of Search ............ 82/160; 279/2.23, 34; 409/234

[56] References Cited

U.S. PATENT DOCUMENTS

| | | | |
|---|---|---|---|
| 4,715,753 | 12/1987 | Tack | 82/160 X |
| 4,726,268 | 2/1988 | Erickson | 82/160 |
| 4,784,542 | 11/1988 | Tack et al. | 82/160 X |
| 4,824,274 | 4/1989 | von Haas | 82/160 X |
| 4,915,523 | 4/1990 | Andersson | 82/160 X |

FOREIGN PATENT DOCUMENTS

WO85/03467 8/1985 PCT Int'l Appl. .
1085759 10/1967 United Kingdom .

*Primary Examiner*—Steven C. Bishop
*Attorney, Agent, or Firm*—Oliff & Berridge

[57] ABSTRACT

A tool holder device including a first and a second member having respectively a projection and a bore which are engageable with each other. The second member has an annular groove which partially defines the bore and is coaxial with the bore. The projection has a through-hole in which are received two engaging members having respective inclined surfaces which are abuttable against with an inclined surface of the annular groove when the two engaging members are moved away from each other upon rotation of a threaded member which engages at least one of the two engaging members. The inclined surfaces of the engaging members and annular groove permit a tight fit between the projection and bore, for removable connection of the first and second members.

15 Claims, 7 Drawing Sheets

TOOL HOLDER DEVICE HAVING SCREW-OPERATED MEANS FOR CONNECTION AND DISCONNECTION OF TWO ENGAGEABLE MEMBERS FOR ATTACHMENT AND REMOVAL OF CUTTING TOOL

BACKGROUND OF THE INVENTION

1. Field of the Invention

The present invention relates to a tool holder device for attaching a cutting tool to a machine tool.

2. Discussion of the Prior Art

An example of a known tool holder device is shown in FIG. 18. This tool holder device includes: 1) a first member 204 having a first flat surface 200 and an engaging projection 202 which protrudes from the first flat surface 200 in a direction perpendicular to the first flat surface 200; and 2) a second member 210 having a second flat surface 206 for close contact with the first flat surface 200, and an engaging bore 208 which is engageable with the engaging projection 202. The second member has a tapped hole 212 formed through the cylindrical wall which defines the engaging bore 208. The tapped hole 212 extends in parallel with the second flat surface 206, for engagement with an externally threaded member 214. The threaded member 214 engaging the tapped hole 212 has a truncated conical end 216 on the side of the bore 208, and a tool engaging hole 218 formed at the other end. The second member has another tapped hole 220 formed in line with the tapped hole 212 in a diametrical opposite direction with respect to the bore 208. This tapped hole 220 receives another externally threaded member 222, which has a truncated conical recess 224 formed at one end thereof on the side of the bore 208.

On the other hand, the first member 204 has a through-hole 230 formed through the engaging projection 202, in parallel with the first flat surface 200. In this through-hole 230, there is slidably received a sliding pin 232. The sliding pin has a length shorter than that of the through-hole 230, and has a truncated conical end 234 adjacent to the truncated conical recess 224 of the externally threaded member 222, and a truncated conical recess 236 at the other end adjacent to the truncated conical end 216 of the externally threaded member 214. These truncated conical end and recess 234, 236 are eccentric with the externally threaded members 222, 214.

The first member 204 has a positioning pin 240 screwed in a tapped hole formed in the first flat surface 200 so as to extend in parallel with the engaging projection 202. The positioning pin 240 engages a hole 242 formed in the second flat surface 206, for positioning the first and second members 204, 210 relative to each other in the circumferential direction, so that the externally threaded members 214, 222 and the sliding pin 232 are aligned with each other in the same plane which passes the axes of the two members 204, 210.

A cutting tool is attached to one of the first and second members 204, 210, while the other member is attached to a machine tool. The first member 204 is attached to the second member 210 such that the engaging projection 20 engages the engaging bore 208 while the positioning pin 240 engages the hole 242. In this condition, the externally threaded member 214 is rotated by a suitable tool such as a hexagon wrench key inserted in the tool engaging hole 218, so that the member 214 is moved until the truncated conical end 216 comes into contact with a surface of the truncated conical recess 236 of the sliding pin 232. The threaded member 214 is further rotated to move the sliding pin 232 until the truncated conical end 234 of the pin 232 comes into contact with a surface of the truncated conical recess 224 of the threaded member 222. As a result, the engaging projection 202 is slightly moved in the direction away from the first member 204, due to the effect of the inclined surfaces of the truncated conical ends and recesses 216, 236, 234, 224, so that the first and second flat surfaces 200, 206 are forced against each other for tight contact thereof. Thus, the cutting tool is attached to the machine tool.

In the tool holder device described above, the sliding pin 232 is disposed in the first member 204 while the externally threaded members 214, 222 are incorporated in the second member 210. If, for example, the first member 204 is used as an adaptor to be attached to a spindle of a machine took while the second member 210 is used as a tool holder for supporting a cutting tool, the two threaded members 214, 222 should be provided in each of the second members 210 used as the tool holders for individual different cutting tools which are selectively attached to the machine spindle. Consequently, the required total number of the threaded members 214, 222 and the cost of the tool holders increase with the number of the cutting tools to be used. Further, the sliding pin 232 provided in the first member 204 used as the adaptor to be attached to the machine spindle disturbs an operation to remove cutting chips and any other foreign matters deposited on the adaptor 204 upon changing of the cutting tools from one kind to another. Similar drawbacks are encountered when the first member 204 is used as the tool holder for supporting the cutting tool while the second member 210 is used as the adaptor attached to the machine spindle.

SUMMARY OF THE INVENTION

The present invention was developed in view of the problem experienced in the prior art discussed above. It is therefore an object of the present invention to provide a tool holder device including a first and a second member which are used as one and the other of a tool holder for supporting a cutting tool and an adaptor to be attached to a machine spindle, and one of which incorporates all components of a screw-operated mechanism for connection and disconnection to and from the other member, the other member incorporating none of the components of the screw-operated mechanism.

The above object may be achieved according to the principle of the present invention, which provides a tool holder device for attaching a cutting tool to a machine tool, the device including a first member having a first flat surface and an engaging projection which protrudes from the first flat surface, and a second member having a second flat surface for close contact with the first flat surface and an engaging bore for engagement with the engaging projection, the cutting tool being supported by one of the first and second members, while the other member being attached to the machine tool, the first and second members being removably connected to each other such that the engaging projection and bore engage with each other, with the first and second flat surfaces held in close contact with each other under pressure, characterized in that: the second member has a circumferential wall having an inner circumferential surface which defines the engaging bore and which has an annular groove coaxial with the engaging bore, the annular groove having an inclined surface which is inclined such that a distance of the inclined surface to the second flat surface in an axial direction of the bore decreases with a decrease in a distance of the inclined surface to a centerline of the bore in a radial direction; that the engaging projection of the first member has a through-hole formed therethrough in parallel with the first flat surface; that two engaging members are received in the through-hole such that the two engaging members are movable relative to each other in a direction of extension of the through-hole, the two engaging members having respective inclined surfaces engageable with the inclined surface of the annular groove, for pressing contact of the first and second flat surfaces, when the two engaging members are moved away from each other; and that a threaded member threadingly engages at least one of the two engaging members, for moving the two engaging members toward and away from each other when the threaded member is rotated in opposite directions, the threaded member having a tool engaging hole for engagement with a tool for rotating the threaded member.

In the tool holder device of the present invention constructed as described above, the threaded member is rotated by a suitable rotating tool engaging the tool engaging hole, to move the two engaging members away from each other in the through-hole formed through the engaging projection, while the engaging projection and bore of the first and second members are in engagement with each other. As a result, the two engaging members are moved into the annular groove, for pressing contact of the inclined surfaces of the engaging members with the inclined surface of the annular groove, to thereby move the first and second members for movement of the projection further into the bore, for tight contact of the first and second flat surfaces with each other under pressure. Thus, the cutting tool is attached to the machine tool through the present tool holder device.

In the present tool holder device, the two engaging members and the threaded member which constitute a screw-operated mechanism are all received and held in the through-hole of the first member, and the second member having the annular groove does not incorporate any component of the screw-operated mechanism for connection and disconnection of the first and second members. In the case where the first member is used as an adaptor to be attached to the machine tool while the second member is used as a tool holder for supporting the cutting tool, the tool holder is simple in construction and available at an accordingly reduced cost. This advantage is significant where two or more tool holders are prepared for two or more different cutting tools, for use with the same adaptor.

Where the first member is used as the tool holder while the second member is used as the adaptor, the adaptor can be easily cleaned, upon a tool changing operation, to remove cutting chips or other foreign matters which may enter the engaging bore during a machining operation.

The two engaging members may consist of a pair of engaging members which engage respective threaded portions of the threaded member such that the pair of engaging members are moved away from each other when the threaded member is rotated in one of the opposite directions. In this case, the two engaging members have respective right- and left-handed screws, while the threaded portions of the threaded member have the corresponding right- and left-handed screws. This arrangement permits a fast change in the distance between the two engaging members with about a half of the rotating angle of the threaded member as required in the conventional device, assuring rapid connection and disconnection of the first and second members.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
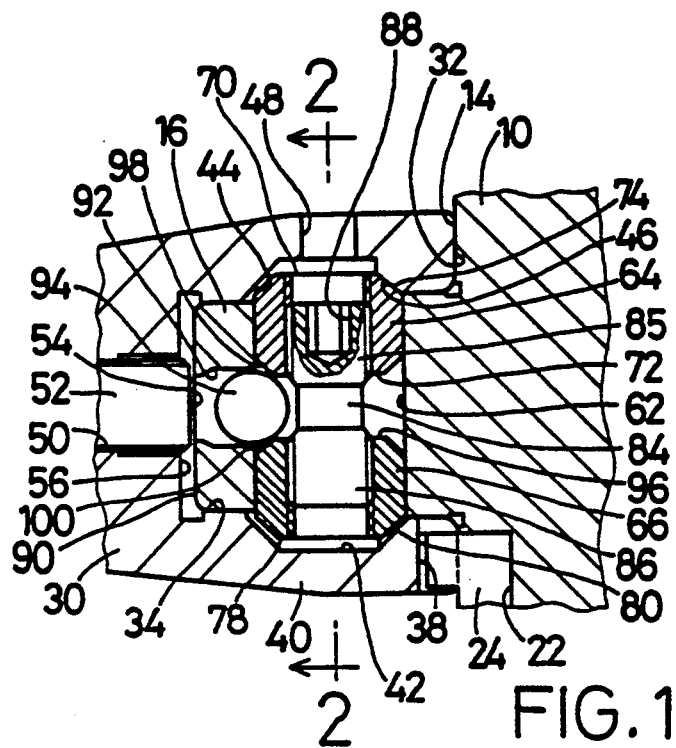
FIG. 1 is a fragmentary front elevational view in cross section of one embodiment of a tool holder device of the present invention.
Figure 7:
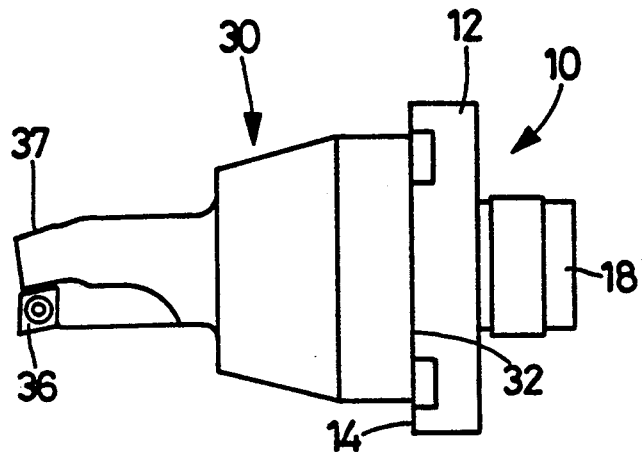
FIG. 7 is an front elevational view showing the entirety of the tool holder device of FIG. 1.
Figure 8:
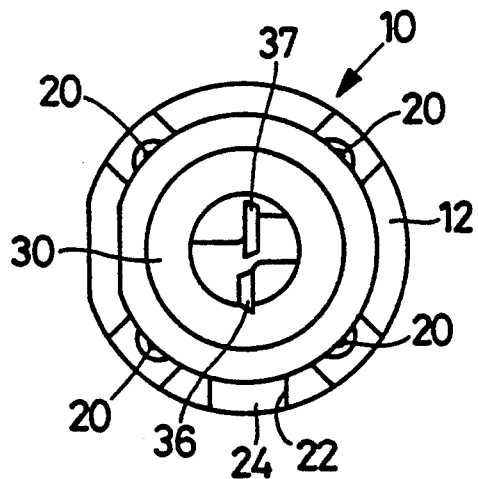
FIG. 8 is a left-hand side end elevational view of the tool holder device of FIG. 7.
Figure 9:
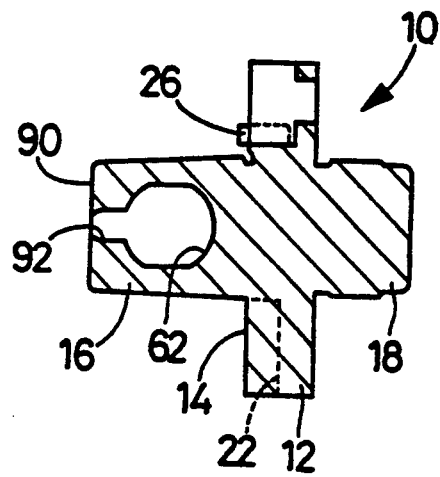
FIG. 9 is a front elevational view in cross section of an adaptor of the tool holder device of FIG. 7.

Referring first to FIGS. 7-9, reference numeral 10 denotes a first member in the form of an adaptor of a tool holder device constructed according to one embodiment of the present invention. The adaptor 10 has a body 12 which has a disc-like shape and an end face in the form of a first flat surface 14. As shown in FIG. 9, the adaptor 10 has an engaging projection 16 formed so as to protrude from the first flat surface 14 in a direction perpendicular to the flat surface 14. The engaging projection 16 has an outer circumferential surface which is tapered such that the outside diameter decreases in the direction away from the flat surface 14. Namely, the end of the projection 16 remote from the flat surface 14 has the smallest outside diameter. The adaptor 10 also has a mounting portion 18 which protrudes from the other end face of the body 12, in the direction perpendicular to the flat surface 14. The adaptor 10 is adapted to be attached, at the mounting portion 18, to a spindle of a machine tool, with four screws 20 which are inserted through respective holes formed through the body 12 and threaded in respective tapped holes formed in the end face of the machine spindle. The screws 20 are tightened by rotation thereof by a suitable tool engaging the heads of the screws 20, which are accessed on the side of the first flat surface 14. Thus, the adaptor 10 is secured to the machine spindle for rotation with the spindle. The first flat surface 24 has a cutout 22 in which a key 24 is fitted, as indicated in FIG. 1 as well as in FIG. 8. The first flat surface 14 also has a hole formed at a position spaced from the cutout 22 in the circumferential direction of the body 12. A positioning pin 26 is fixed in this hole, as shown in FIG. 9.

Figure 10:
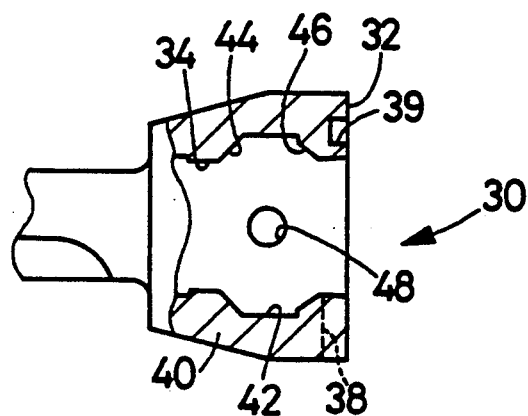
FIG. 10 is a front elevational view in cross section of a tool holder of the tool holder device of FIG. 7.

To the adaptor 10, there is removably connected a second member in the form of a tool holder 30 for supporting a cutting tool in the form of cutting inserts 36, 37, as shown in FIG. 7. The tool holder 30 has an end face in the form of a second flat surface 32 for tight contact with the first flat surface 14 of the adaptor 10. As shown in FIG. 10, the tool holder 30 has an engaging bore 34 formed in the axial direction. The bore 34 is tapered following the tapered outer circumferential surface of the engaging projection 16 of the adaptor 10. The bore 34 is adapted to engage the projection 16, for tight contact therebetween. The tool holder 30 carries the cutting inserts 36, 37 fixed at its free end, so that the inserts 36, 37 are rotated about the axis of the tool holder 30 to cut a workpiece when the tool holder 30 is fixedly connected to the adaptor 10 attached to the machine spindle such that the tool holder 30 is rotated with the spindle via the adaptor 10. The second flat surface 32 of the tool holder 30 has a key slot 38 engageable with the key 24, and a positioning hole 39 engageable with the positioning pin 26.

In the tool holder 30, an inner surface of a circumferential wall 40 which defines the tapered engaging bore 34 has an annular groove 42 coaxial with the bore 34. The annular groove 42 is partially defined by two annular inclined surfaces 44, 46 which cooperate to define an axial width of the annular groove 42. As most clearly shown in FIG. 1, the inclined surface 46 on the side of the second flat surface 32 is inclined such that the distance of the inclined surface 46 to the flat surface 32 decreases with a decrease in the distance of the surface 46 to the centerline of the bore 32 (axis of rotation of the tool holder 30). On the other hand, the other inclined surface 44 is inclined such that the distance of the surface 44 to the flat surface 32 increases as the surface 44 extends toward the centerline of the bore 34. The circumferential wall 40 has a tool access hole 48 formed therethrough in a radial direction of the tool holder 30. The tool holder 30 also has a tapped hole 50 formed in the axial direction, in concentric relationship with the bore 34. The tapped hole 50 communicates with the bore 34, and is adapted to receive an externally threaded member 52, as indicated in FIG. 1. The threaded member 52 is positioned such that an end face 54 of the member 52 on the side of the bore 34 projects into the bore 34 by a small distance from an end face 56 which defines the axial depth of the bore 34.

Figure 2:
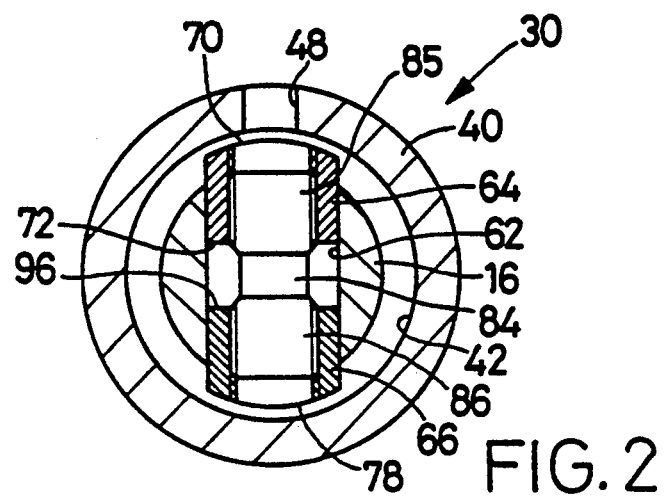
FIG. 2 is an elevational view in cross section taken along line 2—2 of FIG. 1.
Figure 11:
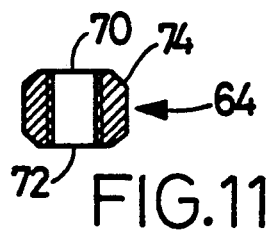
FIG. 11 is a front elevational view in cross section of one of two nuts used in a screw-operated mechanism of the tool holder device.
Figure 12:
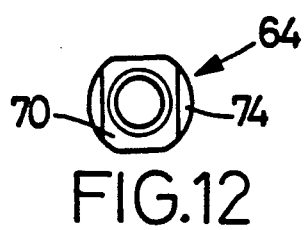
FIG. 12 is a top plan view of the nut of FIG. 11.
Figure 13:
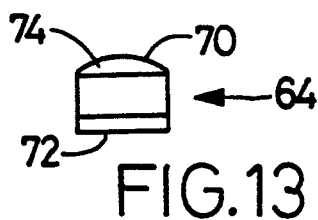
FIG. 13 is a side elevational view of the nut of FIG. 11.

The adaptor 10 has a through-hole 62 formed through the engaging projection 16 in a diametric direction thereof, in parallel with the first flat surface 14. As shown in FIG. 9, the through-hole 62 has a profile defined by a pair of opposed parallel straight segments and a pair of opposed arcuate segments which connect the straight segments. In this through-hole 62, there are slidably received two engaging members in the form of a pair of nuts 64, 66 for abutting contact with the inclined surface 46 of the annular groove 42. The nut 64 has an internal right-handed screw. Since the nut 64 has an outer profile similar to the profile of the through-hole 62, as shown in FIG. 12, the nut 64 is prevented from rotating within the through-hole 62. The nut 64 has a top face 70 which is a part-circumferential surface following the circumferential surface of the annular groove 42, as shown in FIG. 13. The top face 70 and a bottom face 72 (FIGS. 11 and 13) of the nut 64 are chamfered at opposite ends thereof as viewed in the longitudinal direction. Consequently, the tap face 70 has an inclined surface 74 for abutting contact with the inclined surface 46 of the annular groove 42, as indicated in FIGS. 11 and 12. The other nut 66, which has an internal left-handed screw, has an arcuate top face 78 similar to the arcuate top face 70, and an inclined surface 80 similar to the inclined surface 74, as shown in FIGS. 1 and 2.

The two nuts 64, 66 engage an externally threaded member 84. More specifically described, the externally threaded member 84 has a right-handed screw portion 85 and a left-handed screw portion 86 formed over a suitable distance from the respective opposite ends, so that these screw portions 85, 86 are screwed in the respective nuts 64, 66, in the direction parallel with the through-hole 62. The right-handed screw portion 85 has a tool engaging hole 88 formed in its end face, so that the threaded member 84 may be rotated with a suitable tool such as a hexagon wrench key inserted in the hole 88. When the threaded member 84 is rotated in the clockwise direction with a wrench key engaging the hole 88, the two nuts 64, 66 are moved away from each other. When the threaded member 84 is rotated in the counterclockwise direction, the two nuts 64, 66 are moved toward each other.

Figure 3:
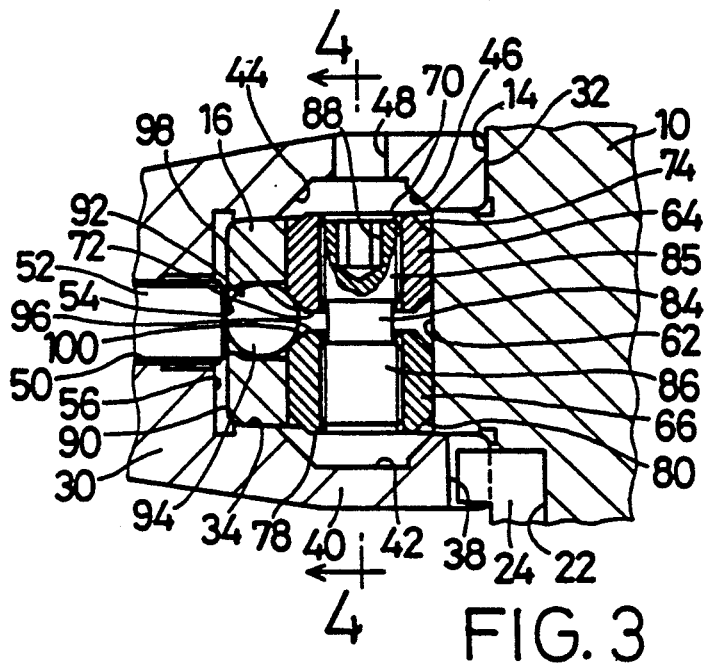
FIG. 3 is a fragmentary cross sectional front elevational view of the tool holder device of FIG. 1 placed in an operating state different from that of FIG. 1.
Figure 5:
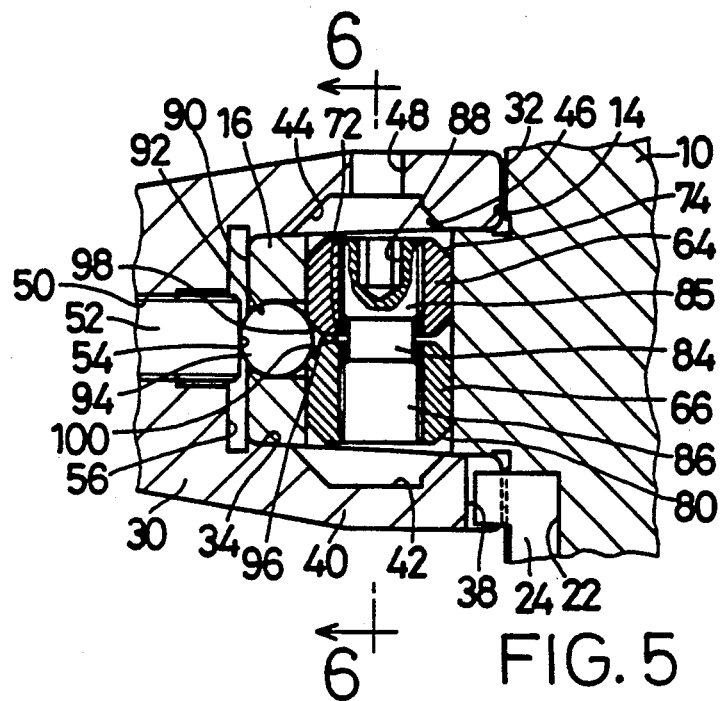
FIG. 5 is a fragmentary cross sectional front elevational view of the tool holder device of FIG. 1 placed in another operating state.

As shown in FIG. 9, the engaging projection 16 of the adaptor 10 has a ball-receptacle hole 92 which is formed so as to extend from the outer one of the opposed arcuate surfaces of the through-hole 62, in the axial direction. This ball-receptacle hole 92 is open in the end face 90 of the projection 16, and is adapted to accommodate a ball 94 therein, as shown in FIG. 1. The hole 92 has a smaller diameter at its open end in the end face 90, than the diameter of the ball 94, so as to prevent the ball 94 from moving out of the hole 92 through the open end. The ball 94 may move into the through-hole 62 as the two nuts 64, 66 are spaced apart from each other, as indicated in FIG. 1. As the nuts 64, 66 are moved toward each other, the ball 94 is pushed into the hole 92 by chamfers 98, 100 formed on the bottom faces 72, 96 of the nuts 64, 66, as indicated in FIG. 3. When the spacing between the two nuts 64, 66 is the smallest, the ball 94 partially projects from the end face 90 of the projection 16, in pressing contact with the end face 54 of the externally threaded member 52 fixed in the tool holder 30, as shown in FIG. 5.

In the tool holder device constructed as described above, the tool holder 30 is removably connected to the adaptor 30 which has been attached to the machine spindle. Initially, the tool holder 30 is moved for engagement of the engaging bore 34 with the engaging projection 16 of the adaptor 10, while the tool holder 30 and the adaptor 10 are positioned relative to each other in the circumferential direction such that the key slot 38 and positioning hole 39 are aligned with the key 24 and the positioning pin 26, respectively. Since the projection 16 and the bore 34 are both tapered, the projection 16 can be readily inserted into the bore 34. It is noted that the two nuts 64, 66 are positioned close to each as indicated in FIG. 5 before the tool holder 30 is fitted on the adaptor 10. Then, a wrench key is inserted in the tool access hole 48, for engagement with the tool engaging hole 88 of the threaded member 84. The threaded member 84 is rotated by the wrench key, to move the two nuts 64, 66 in the opposite directions away from each other, until the inclined surfaces or chamfers 74, 80 of the nuts 64, 66 come into contact with the inclined surface 64 of the annular groove 42 of the tool holder 30. As the threaded member 84 is further rotated, the inclined surface 46 is pushed by the inclined surfaces 74, 80, whereby the tool holder 30 is moved toward the adaptor 10 for tight fit between the bore 34 and projection 16, with the first and second flat surfaces 14, 32 held in pressing contact with each other. Thus, the tool holder 30 is securely connected or attached to the adaptor 10, so that the cutting inserts 36, 37 carried by the tool holder 30 are fixed to the machine spindle via the adaptor 10. A rotary motion of the machine spindle is transmitted to the tool holder 30 through the key 24 interposed between the adaptor 10 and the tool holder 30.

Figure 4:
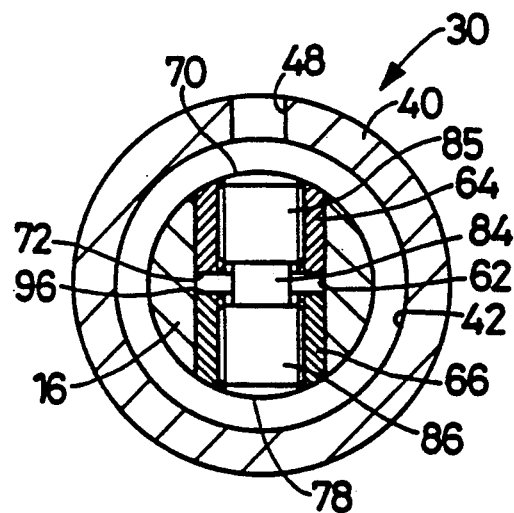
FIG. 4 is an elevational view in cross section taken along line 4—4 of FIG. 3.
Figure 6:
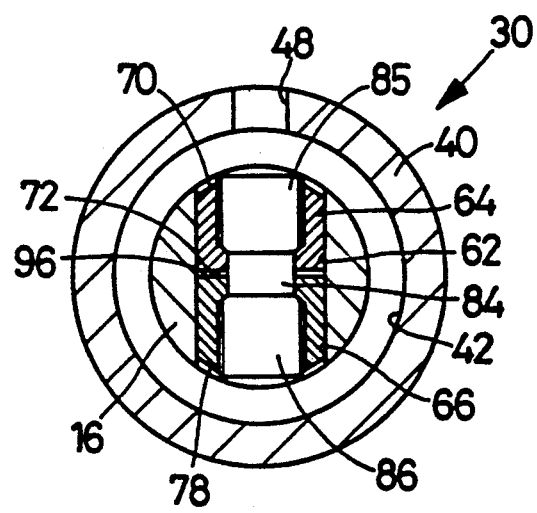
FIG. 6 is an elevational view in cross section taken along line 6—6 of FIG. 5.

When the tool holder is disconnected or removed from the adaptor 10, for changing the cutting inserts 36, 37 to other tool or replacing the worn inserts 36, 37 with new ones, the threaded member 88 is rotated in the reverse direction, with the wrench key engaging the hole 88, to move the two nuts 64, 66 toward each other as indicated in FIGS. 3 and 4, whereby the inclined surfaces 74, 80 are moved away from the inclined surface 46 of the annular groove 42, with the nuts 64, 66 positioned radially inward of the annular groove 42, while the ball 94 is pushed into the ball-receptacle hole 92 by the chamfers 98, 100 of the nuts 64, 66. With the threaded member 84 further rotated to move the nuts 64, 66 further away from each other, as indicated in FIGS. 5 and 6, the ball 94 partially projects from the end face 90 and comes into pressing contact with the end face 54 of the threaded member 54 of the tool holder 30, to thereby disengage the engaging bore 34 and the engaging projection 16 from each other. In this condition, the tool holder 30 may be easily removed from the adaptor 10.

It will be understood from the foregoing description of the present embodiment that the two nuts 64, 66, externally threaded member 84 and ball 94 are all accommodated within the adaptor 10, and none of these components are provided in the tool holder 30. This means a reduced cost for the tool holder device, where a plurality of tool holders 30 are used for a single adaptor 10, for changing the cutting tools together with the respective tool holders 30.

Figure 18:
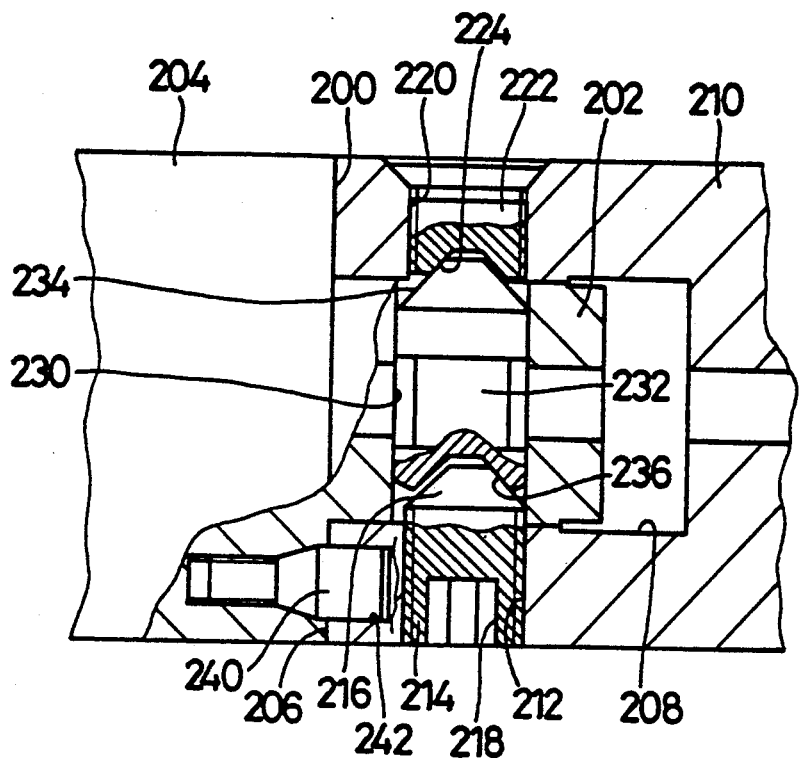
FIG. 18 is a fragmentary front elevational view of a known tool holder device.

In the present embodiment, the two nuts 64, 66 are moved toward and away from each other by bidirectional rotation of the threaded member 84. This results in improved efficiency of connection and disconnection of the tool holder 30 to and from the adaptor 10, with the rotating angle of the threaded member 84 which is about a half of that required in the conventional tool holder device of FIG. 18.

It is noted that the tapered configuration of the projection 16 and bore 34 facilitates their engagement, that is, close or tight fit of the projection 16 with respect to the bore 34 by merely inserting the projection 16 into the bore 34. This assures accurate and rigid support and positioning of the cutting inserts 36, 37 with respect to the machine spindle. Further, the provision of the ball 94 and the threaded member 52 facilitates the removal of the tool holder 30 from the adaptor 10, that is, the disengagement of the projection 16 and bore 34, with the ball pushing the threaded member 52.

Figure 14:
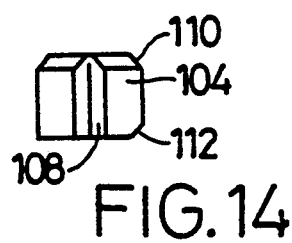
FIG. 14 is a nut used in another embodiment of the tool holder device of the invention.
Figure 15:
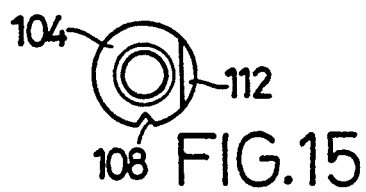
FIG. 15 is a bottom plan view of the nut of FIG. 14.

While the nuts 64, 66 used in the above embodiment have an outer profile having a pair of opposed straight segments and a pair of opposed arcuate segments, these nuts may be replaced by nuts 104 having a circular outer profile as shown in FIG. 14 and 15. In this case, each nut 104 has a cutout 108 in the outer circumferential surface, for encasement with a tip of a small screw fixed to the projection 16, so that the nut 104 is prevented from rotating in the through-hole 62. The nut 104 has an annular chamfer or inclined surface 110 for abutting contact with the inclined surface 44 of the annular groove 42. However, the inclined surface 110 may be replaced by a chamfer similar to the chamfer 74, 80 in the above embodiment. The nut 104 has an inclined surface 112 formed at its bottom face, for pushing the ball 94.

Figure 16:
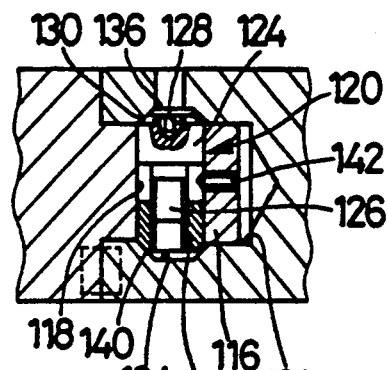
FIG. 16 is a fragmentary front elevational view in cross section of a further embodiment of the tool holder device of the invention.

Referring next to FIG. 16, there will be described a further embodiment of the present invention. In this embodiment, an engaging projection 116 of an adaptor to be attached to the machine spindle has a through-hole 118 in which a bolt 120 and a nut 122 are received such that the bolt 120 is slidably rotatable and axially movable in the through-hole 118 while the nut 122 is slidably axially movable in the through-hole 118. The bolt 120 a has head 124 having a circular cross sectional shape and a relatively large diameter, and an externally threaded portion 126 which extends from the head 124 for engagement with the nut 122. The head 124 has a tool engaging hole 128 for rotating the bolt 122, that is, for rotating the threaded portion 126. The head 124 further has an annular chamfer or inclined surface 130 for abutting contact with an inclined surface 136 of an annular groove 134 formed in the surface which defines an engaging bore 132 of a tool holder. The nut 122 has a rectangular cross sectional shape and engages a rectangular portion of the through-hole 118, such that the nut 122 is prevented from rotating in the through-hole 118. The nut 122 has an inclined surface 140 for abutting contact with the inclined surface 136 of the annular groove 134. A small screw 142 is provided to limit the distances of movements of the nut 122 and bolt 120. With the bolt 120 rotated with a suitable tool engaging the hole 128, the head 124 and the nut 122 are moved away from each other, for pressing contact of the inclined surfaces 130, 140 with the inclined surface 136 of the annular groove 134. In the present embodiment, the head 124 and the nut 122 function as two engaging members for abutting contact with the inclined surface 136 of the annular groove 134, while the threaded portion 126 functions as an externally threaded member engaging one of the two engaging members 124, 122.

Figure 17:
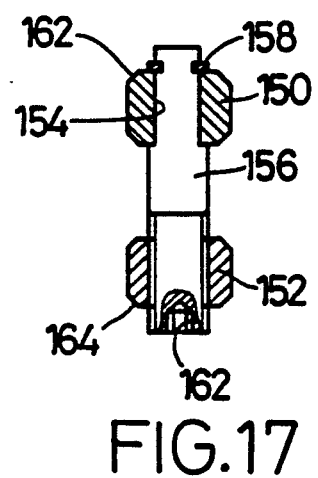
FIG. 17 is a front elevational view in cross section of a nut used in the screw-operated mechanism of a still further embodiment of the invention.

A still further embodiment of this invention is illustrated in FIG. 17, wherein a block 150 and a nut 152 function as two engaging members engageable with an inclined surface of an annular bore formed in the tool holder. The block 150 has an axial bore 154 through which a small-diameter portion of an externally threaded member 156 extends such that the threaded member 156 is rotatable relative to the block 150 while the threaded member and the block 150 are prevented from moving relative to each other in the axial direction, by a retainer ring 158. The nut 152 engages an externally threaded portion of the threaded member 156, which has a tool engaging hole 162 for engagement with a suitable tool for rotating the threaded member 156. The rotation of the block 150 and nut 152 is prevented by suitable means as used in the preceding embodiments. With the threaded member 156 rotated, the block 150 and the nut 152 are moved relative to each other in the axial direction, for abutting contact of the inclined surfaces 162, 164 with the inclined surface of the annular groove of the tool holder, to establish a tight fit between the tool holder and the adaptor.

While the engaging projection 16, 116 and the engaging bore 34, 132 are tapered in the above embodiments of FIGS. 1–16, the projection and bore may have straight outer and inner circumferential surfaces, respectively. It is to be understood that the invention may be embodied embodied with various other changes, modifications and improvements, which may occur to those skilled in the art, in the light of the foregoing teachings.

What is claimed is:

1. A tool holder device for attaching a cutting tool to a machine tool, the device including a first member having a first flat surface and an engaging projection which protrudes from said first flat surface and which has an end face, and a second member having a second flat surface for close contact with said first flat surface and an engaging bore for engagement with said engaging projection, said cutting tool being supported by one of said first and second members, while the other member being attached to the machine tool, said first and second members being removably connected to each other such that said engaging projection and bore engage with each other, with said first and second flat surfaces held in close contact with each other under pressure, wherein the improvement comprises:

said second member having a circumferential wall having an inner circumferential surface which defines said engaging bore and which has an annular groove coaxial with said engaging bore, said annular grove having an inclined surface which is inclined such that a distance of said inclined surface to said second flat surface in an axial direction of said bore decreases with a decrease in a distance of said inclined surface to a centerline of said bore in a radial direction;

said engaging projection of said first member has a through-hole formed therethrough in parallel with said first flat surface;

two engaging members received in said through-hole such that said two engaging members are movable relative to each other in a direction of extension of said through-hole, said two engaging members having respective first inclined surfaces engageable with said inclined surface of said annular groove, for pressing contact of said first and second flat surfaces, when said two engaging members are moved away from each other, said two engaging members having respective second inclined surfaces;

a threaded member threadingly engaging at least one of said two engaging members, for moving said two engaging members toward and away from each other when said threaded member is rotated about an axis of rotation thereof in opposite directors, said threaded member having a tool engaging hole for engagement with a tool for rotating said threaded member, a pressing member engageable with said second inclined surfaces of said two engaging members, for pressing contact with said second member at said end face of said engaging projection, to thereby move said first and second members in opposite axial direction for separation of said first and second flat surfaces, when said two engaging members are moved toward each other, said first inclined surfaces of said two engaging members being located on one of opposite sides of said axis of rotation of said threaded member which is remote from said end face of said engaging projection, while said second inclined surfaces being located on the other of said opposite sides of said axis of rotation.

2. A tool holder device according to claim 1, wherein said two engaging members consist of a pair of engaging members which engage respective threaded portions of said threaded member such that said pair of engaging members are moved away from each other when said threaded member is rotated in one of said opposite directors.

3. A tool holder device according to claim 2, wherein said threaded member consists of an externally threaded member while said pair of engaging members consist of a pair of nuts engaging said externally threaded member.

4. A tool holder device according to claim 2, wherein said respective threaded portions have a right-handed screw and a left-handed screw, respectively.

5. A tool holder device according to claim 1, wherein said threaded member consists of an externally threaded member having an externally threaded portion and a non-threaded portion, while said two engaging members consist of a block having a center bore through which said non-threaded portion extends, and a nut which engages said externally threaded portion of said externally threaded member, said block engaging said non-threaded portion such that said block is moved with said externally threaded member relative to said nut when said externally threaded member is rotated.

6. A tool holder device according to claim 1, wherein said circumferential wall of said second member has a tool access hole through which said tool engaging hole is accessible by said tool for rotating said threaded member.

7. A tool holder device according to claim 1, wherein said first member has means for preventing at least one of said two engaging members from being rotated within said through-hole when said threaded member is rotated.

8. A tool holder device according to claim 1, wherein said engaging projection and said engaging bore are tapered.

9. A tool holder device according to claim 1, wherein said first member functions as an adaptor to be attached to said machine tool while said second member functions as a tool holder for supporting said cutting tool.

10. A tool holder device according to claim 1, wherein each of said two engaging members has a generally cylindrical outer surface concentric with said axis of rotation of said threaded member.

11. A tool holder device according to claim 10, wherein said generally cylindrical outer surface has means for preventing said each of said two engaging members from rotating about said axis of rotation when said threaded member is rotated.

12. A tool holder device for attaching a cutting tool to a machine tool, the device including a first member having a first flat surface and an engaging projection which protrudes from said first flat surface, and a second member having a second flat surface for close contact with said first flat surface and an engaging bore for engagement with said engaging projection, said cutting tool being supported by one of said first and second members, while the other member being attached to the machine tool, said first and second members being removably connected to each other such that said engaging projection and bore engage with each other, with said first and second flat surfaces held in close contact with each other under pressure, wherein the improvement comprises:

said second member having a circumferential wall having an inner circumferential surface which defines said engaging bore and which has an annular groove coaxial with said engaging bore, said annular groove having an inclined surface which is inclined such that a distance of said inclined surface to said second flat surface in an axial direction of said bore decreases with a decrease in a distance of said inclined surface to a centerline of said bore in a radial direction;

said engaging projection of said first member has a through-hole formed therethrough in parallel with said first flat surface;

two engaging members received in said through-hole such that said two engaging members are movable relative to each other in a direction of extension of said through-hole, said two engaging members having respective inclined surfaces engageable with said inclined surface of said annular groove, for pressing contact of said first and second flat surfaces, when said two engaging members are moved away from each other, and a threaded member threadingly engaging at least one of said two engaging members, for moving said two engaging members toward and away from each other when said threaded member is rotated in opposite directions, said threaded member having a tool engaging hole for engagement with a tool for rotating said threaded member, wherein said first member has a ball-receptacle hole formed axially through said engaging projection, said ball-receptacle hole communicating with said through-hole and open in an end face of said projection, said ball-receptacle hole accommodating a ball such that said ball is movable by contact thereof with said two engaging members, partially beyond said end face, for pressing contact with said second member to thereby move said first and second members in opposite axial directions for separation of said first and second flat surface.

13. A tool holder device for attaching a cutting tool to a machine tool, the device including a first member having a first flat surface and an engaging projection which protrudes from said first flat surface, and a second member having a second flat surface for close contact with said first flat surface and an engaging bore for engagement with said engaging projection, said cutting tool being supported by one of said first and second members, while the other member being attached to the machine tool, said first and second members being removably connected to each other such that said engaging projection and bore engage with each other, with said first and second flat surfaces held in close contact with each other under pressure, wherein the improvement comprises:

said second member having a circumferential wall having an inner circumferential surface which defines said engaging bore and which has an annular groove coaxial with said which is inclined such that a distance of said inclined surface to said second flat surface in an axial direction of said bore decreases with a decrease in a distance of said inclined surface to a centerline of said bore in a radial direction;

said engaging projection of said first member has a through-hole formed therethrough in parallel with said first flat surface;

two engaging members received in said through-hole such that said two engaging members are movable relative to each other in a direction of extension of said through-hole, said two engaging members having respective inclined surfaces engageable with said inclined surface of said annular groove, for pressing contact of said first and second flat surfaces, when said two engaging members are moved away from each other; and a threaded member threadingly engaging at least one of said two engaging members, for moving said two engaging members toward and away from each other when said threaded member is rotated in opposite directions, said threaded member having a tool engaging hole for engagement with a tool for rotating said threaded member, wherein said two engaging members consist of a head of a bolt received in said through-hole, and a nut engaging said threaded member, while said threaded member consists of an externally threaded portion of said bolt which engages said nut.

14. A tool holder device for attaching a cutting tool to a machine tool, the device including a first member having a first flat surface and an engaging projection which protrudes from said first flat surface and a which has an end face, and a second member having a second flat surface for close contact with said first flat surface and an engaging bore for engagement with said engaging projection, said cutting tool being supported by one of said first and second members, while the other member being attached to the machine tool, said first and second members being removably connected to each other such that said engaging projection and bore engage with each other, with said first and second flat surfaces held in close contact with each other under pressure, wherein the improvement comprises:

said second member having a circumferential wall having an inner circumferential surface which defines said engaging bore and which has an annular groove coaxial with said engaging bore, said annular groove having an inclined surface which is inclined such that a distance of said inclined surface to said second flat surface in an axial direction of said bore decreases with a decrease in a distance of said inclined surface to a centerline of said bore in a radial direction;

said engaging projection of said first member has a through-hole formed therethrough in parallel with said first flat surface;

two engaging members received in said through-hole such that said two engaging members are movable relative to each other in a direction of extension of said through-hole, said two engaging members having respective inclined surfaces engageable with said inclined surface of said annular groove, for pressing contact of said first and second flat surfaces, when said two engaging members are moved away from each other; and a threaded member threadingly engaging at least one of said two engaging members, for moving said two engaging members toward and away from each other when said threaded member is rotated in opposite directions, said threaded member having a tool engaging hole for engagement with a tool for rotating said threaded member, said threaded member having an axis of rotation which is located between said inclined surface of said annular groove and said end face of said engaging projection when said engaging projection is in engagement with said engaging bore;

said circumferential wall of said second member having a tool access hole through which said tool engaging hole of said threaded member is accessible by said tool for rotating said threaded member.

15. A tool holder device according to claim 14, wherein each of said two engaging members has a generally cylindrical outer surface concentric with said axis of rotation of said threaded member.

* * * * *